United States Patent
Dubois et al.

(10) Patent No.: US 8,200,193 B2
(45) Date of Patent: Jun. 12, 2012

(54) DETECTION OF ANOMALIES IN TRAFFIC TRANSMITTED BY A MOBILE TERMINAL WITHIN A RADIOCOMMUNICATION NETWORK

(75) Inventors: Jean-Marie Dubois, Velizy (FR); René Raynaud, Nozay (FR)

(73) Assignee: Alcatel Lucent, Paris (FR)

( * ) Notice: Subject to any disclaimer, the term of this patent is extended or adjusted under 35 U.S.C. 154(b) by 370 days.

(21) Appl. No.: 12/455,743

(22) Filed: Jun. 5, 2009

(65) Prior Publication Data

US 2009/0325543 A1 Dec. 31, 2009

(30) Foreign Application Priority Data

Jun. 12, 2008 (FR) ...................................... 08 53903

(51) Int. Cl.
*H04M 1/66* (2006.01)
(52) U.S. Cl. .......... 455/411; 455/410; 713/188; 726/23; 726/24; 726/25; 726/29; 726/30; 370/231; 370/232; 370/235; 370/236
(58) Field of Classification Search ........................ None
See application file for complete search history.

(56) References Cited

U.S. PATENT DOCUMENTS

| 5,978,669 | A | 11/1999 | Sanmugam |
| 6,611,684 | B1* | 8/2003 | Franks ........................... 455/433 |
| 2004/0185823 | A1* | 9/2004 | Chin et al. .................. 455/404.1 |
| 2004/0203575 | A1* | 10/2004 | Chin et al. .................. 455/404.1 |
| 2006/0236390 | A1 | 10/2006 | Matovsky et al. |
| 2007/0275741 | A1 | 11/2007 | Bian et al. |

FOREIGN PATENT DOCUMENTS

| EP | 1771031 | 4/2007 |
| WO | WO 0145444 | 6/2001 |

* cited by examiner

*Primary Examiner* — Rafael Pérez-Gutiérrez
*Assistant Examiner* — Suhail Khan
(74) *Attorney, Agent, or Firm* — Carmen Patti Law Group, LLC

(57) ABSTRACT

To detect an anomaly in traffic sent by at least one mobile terminal (TM) in a radiocommunication network, a device capable of communicating with a radiocommunication network (RR) location register (HLR) comprises an evaluation module (ME) to increase, for a predetermined time interval, an authentication account (CA) assigned to the mobile terminal when security data (DS) are transmitted to a network unit to authenticate the mobile terminal, to detect an anomaly in the traffic sent by the mobile terminal if the authentication account exceeds a predefined upper limit value upon expiration of the predetermined time interval, and to transmit a message concerning such traffic anomaly to a unit in the network in charge of taking the necessary measures to eliminate the said anomaly.

16 Claims, 2 Drawing Sheets

DETECTION OF ANOMALIES IN TRAFFIC TRANSMITTED BY A MOBILE TERMINAL WITHIN A RADIOCOMMUNICATION NETWORK

This application is based on and claims the benefit of French Patent Application 0853903 filed on Jun. 12, 2008 which is incorporated by reference herein in its entirety.

TECHNICAL FIELD

The present invention concerns the detection of dysfunctions in a mobile terminal within a radiocommunication network, for example due to the presence of a virus in the mobile terminal that generates an anomaly in the traffic sent by the mobile terminal.

BACKGROUND

Today, mobile terminals are becoming ever more complex, and they implement operating systems that may become infected by viruses or be targeted by malicious attacks.

Certain types of virus generate the sending of short SMS ("Short Message Service") messages from an infected mobile terminal to another terminal having a given calling number, which increases the bill for the use of the infected mobile terminal in an uncontrolled manner. Other types of virus can lead to a dysfunction in a mobile terminal and useless resource consumption on the part of the mobile terminal or of the radiocommunication network to which the mobile terminal is connected.

There is therefore a need rapidly to detect an abnormal behavior on the part of a mobile terminal, due for example to the presence of a virus in the mobile terminal, in order to limit harmful consequences of the abnormal behavior of the mobile terminal.

SUMMARY

The present invention concerns the detection of dysfunctions in a mobile terminal within a radiocommunication network, for example due to the presence of a virus in the mobile terminal that generates an anomaly in the traffic sent by the mobile terminal.

One goal of the invention is to detect an abnormal behavior of a mobile terminal related to the data traffic transmitted by the mobile terminal within a radiocommunication network so that at least one unit of the radiocommunication network can launch actions to remedy the abnormal behavior detected.

To achieve this objective, a method according to the invention to detect an anomaly in the traffic sent by at least one mobile terminal in a radiocommunication network is characterized in that it comprises the following steps in a device capable of communicating with a radiocommunication network location register:

for at least a predetermined time interval, increase an authentication account assigned to the mobile terminal when security data are transmitted to a network unit to authenticate the mobile terminal, and compare the authentication account to a predefined upper limit value in order to detect an anomaly in the traffic sent by the mobile terminal if the authentication account exceeds the predefined upper limit value.

Advantageously, the invention offers an additional functionality to the radiocommunication network in order to detect abnormal activity in a mobile terminal, such as an anomaly in the traffic sent by the mobile terminal. A collaboration between the said device and the radiocommunication network location register enables detection of a traffic anomaly regardless of the location of the mobile terminal.

BRIEF DESCRIPTION OF THE DRAWINGS

The present invention and the benefits thereof shall be better understood upon examining the description below, which makes reference to the attached figures, in which.

DESCRIPTION OF EMBODIMENTS

Figure 1:
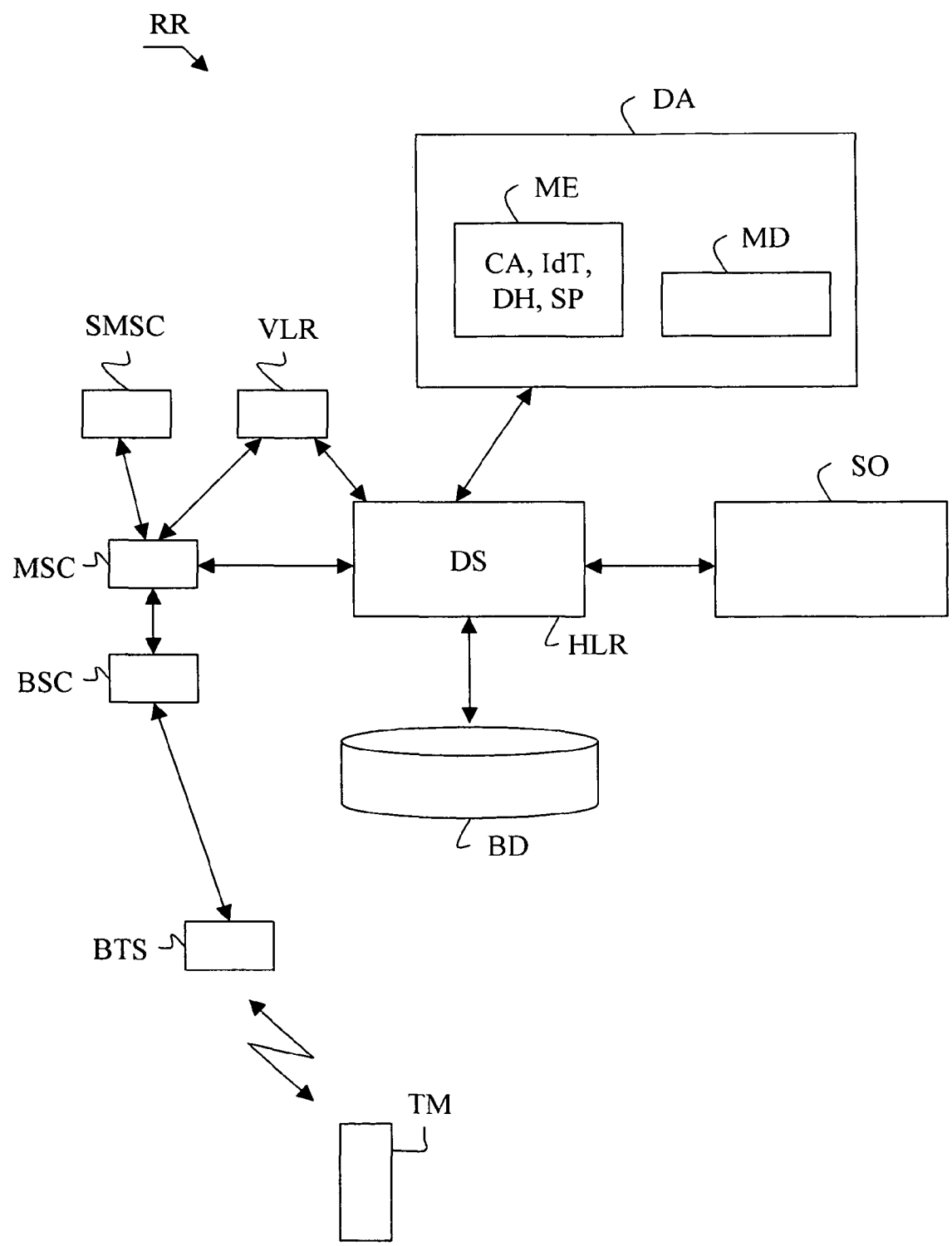
FIG. 1 is a schematic block diagram of a communication system including a detection device for anomalies in relation to a mobile terminal in a radiocommunication network according to the invention.

In reference to FIG. 1, a communication system according to the invention comprises, in particular, a radiocommunication network RR, an alert device DA, an operator server SO connected to or included in the radiocommunication network RR, and at least one mobile terminal TM.

For example, the radiocommunication network RR is a digital cellular radiocommunication network of the GSM (Global System for Mobile communications) or UMTS (Universal Mobile Telecommunications System), or even CDMA (Code Division Multiple Access) type. The GSM type network may be coupled with a GPRS (General Packet Radio Service) network for the transmission of data by packets with mobility and access management via radio. For example, the radiocommunication network RR is able to authorize a mobile terminal to send and receive data via the RR network when the user of the mobile terminal is identified at the network, for example by means of a subscriber identification module associated to the mobile terminal.

FIG. 1 represents components of the localization area of the GSM type RR network where the communicating equipment is situated. The localization area comprises an MSC (Mobile service Switching Center) which is connected by means of a BSC (Base Station Controller) to a base station BTS (Base Transceiver Station) connected by means of a radio link to the mobile terminal TM.

The network RR comprises a nominal location register HLR (Home Location Register) and one or more VLR (Visitor Location Register) location registers connected to the switch MSC. The register HLR manages a database BD containing, in particular, an international identity IMSI (International Mobile Subscriber Identity) associated to a subscription profile for each user of the network RR and the number of the register VLR to which the mobile terminal TM is temporarily connected. The register VLR is a relay of the register HLR and contains characteristics of the users located in the localization area to manage their mobility.

The register HLR, via an authentication center AUC, provides authentication of each mobile terminal of the radiocommunication network, e.g. by means of the SIM ("Subscriber Identity Module") card included in the mobile terminal. In particular, the register HLR generates security data DS in the form of an authentication vector, and transmits the said data to a unit of the network requiring authentication of the mobile terminal. If the radiocommunication network is of the GSM type, the authentication vector may comprise a random challenge RAND, a signature SRES, and an encryption key Kc to authenticate the mobile terminal and encrypt all communications between the mobile terminal and the radiocommunication network, such as calls, the sending of short SMS messages, the sending of USSD (Unstructured Supplementary Service Data) messages, etc. If the radiocommunication network is of the UMTS type, the authentication vector may comprise a random challenge RAND, a signature SRES, an expected response XRES, an encryption key Kc, an integrity key IK, and an authentication token AUTN.

Each SIM card shares a secret key Ki with the register HLR. The secret key may for example be a word, a sequence of words, or a number of a length of 128 bits, and it is securely memorized both in the SIM card and in the HLR register.

Authentication of mobile terminal may be requested by a network unit, such as a VLR register, for example every time the localization is updated, every time a call is made, or before activating or deactivating certain additional services. Furthermore, a random challenge RAND generated by the register HLR, for example of a length of 128 bits, can be transmitted to the mobile terminal.

For example, the mobile terminal may determine a signature for the random challenge RAND received from the network as a function of an authentication algorithm A3 applied to the secret key Ki and to the challenge RAND. The signature is sent by the mobile terminal to the network to authenticate the mobile terminal, by comparing the signature determined by the mobile terminal to the signature SRES initially transmitted by the register HLR to match the challenge RAND.

Furthermore, the mobile terminal may determine an encryption key Kc as a function of an encryption key determination algorithm A8 applied to the secret key Ki and to the challenge RAND. An encryption algorithm A5 is then applied to the encryption key Kc to encrypt communications between the mobile terminal and the network.

Generally, the register HLR generates the authentication vectors containing security data DS for a series of several vectors. Upon request from a network unit, such as a register VLR, the register HLR generates a predefined number of authentication vectors, and the register HLR directly transmits such vectors to the network unit, or may, alternatively, store the vectors thus generated. The register supplies such vectors to a network unit when the latter requires at least one vector for procedures requiring authentication and that relate to the mobile terminal, for example to set up a call or send a message. Each vector is used only once, and the register HLR generates and transmits new authentication vectors comprising security data once all previously sent authentication vectors have been utilized.

According to the invention, the alert device DA is capable of detecting anomalies related to the operation of one or more mobile terminals connected to the radiocommunication network as a function of data managed by the register HLR. According to one embodiment, the alert device DA is directly or indirectly linked to the register HLR via a packet based communication network. According to another embodiment, the alert device DA is included in the register HLR. As a variant, the alert device DA and the register HLR are merged into one and the same unit.

The alert device DA comprises an evaluation module ME comprising authentication counters in a number sufficient to be respectively assigned to mobile terminals. In particular, an authentication account CA is associated to an identifier IdT of a given mobile terminal, and is increased when security data DS are transmitted to a network unit to authenticate the mobile terminal. Thereafter, the account CA of the authentication counter is to be understood as being the value of the authentication counter at a given moment, and the different accounts of the authentication counter may match the different values that may be assumed by the authentication counter.

According to one example, the authentication account CA is increased by one unit when an authentication vector comprising security data is transmitted. Therefore, the account is increased e.g. by five units as soon as the register HLR transmits a series of five authentication vectors. According to another example, the account is increased only by one unit when the register HLR transmits a series of authentication vectors.

For example, the mobile terminal identifier IdT can be a calling number for the mobile terminal or an international identity IMSI. The register HLR can have a mobile terminal identity IMEI (International Mobile Equipment Identity) e.g. when the register VLR transmits to it during a procedure of localisation of the mobile terminal or during an update performed when the subscriber changes mobile terminals.

In the evaluation module ME at least one predefined upper limit value SP is memorized, to which the account CA of each authentication counter is compared. The value of the upper limit value signifies an anomaly in the operation of the mobile terminal and corresponds to e.g. automatic or repeated actions that cannot be executed by a user of the mobile terminal. For example, the predefined upper limit value has a value of "100" and corresponds to the transmission of one hundred authentication vectors comprising security data during a predetermined time interval, e.g. of around twenty minutes.

The evaluation module ME detects an anomaly when the predefined upper limit value is exceeded by an authentication account.

The evaluation module ME can simultaneously activate a clock with the authentication counter to memorize clock data to match the authentication accounts.

In an embodiment of the invention, the clock data serve to start a predetermined time interval running so that the account is reset to zero upon expiration of the predetermined time interval. The predetermined time interval may e.g. be periodic, i.e. that the time interval can be repeated and have either the same or a different duration each time. The predetermined time interval may thus match a monitoring period during which the authentication account is increased before being reset to zero upon expiration of the monitoring period so as once again to increase the account during another monitoring period. For example, upon expiration of the monitoring period or after expiration thereof, the evaluation module ME compares the authentication account to the predefined upper limit value and detects an anomaly when the predefined upper limit value is exceeded by the account. According to another embodiment, the evaluation module ME compares the authentication account to the predefined upper limit value as soon as the latter is increased in order to detect an anomaly without waiting for expiration of the monitoring period.

The predefined upper limit value depends on the duration of the predetermined time interval, such values being determined by the radiocommunication network operator. For example, the predefined upper limit value can correspond to the transmission of fifty authentication vectors comprising security data during a ten minute period.

In another embodiment of the invention, each authentication account CA of a counter is memorized matching clock data DH so that the evaluation module ME can verify that the authentication account has not increased by a value that is higher than the predefined upper limit value during the predetermined time interval.

The alert device DA further comprises a detection module MD cooperating with the evaluation module ME when the latter has detected an anomaly, in order to transmit an alert message to the operator server SO.

According to the invention, the operator server SO is capable of carrying out transactions further to detection of an anomaly by the alert device DA. The operator server SO can be directly or indirectly linked to the alert device DA via a packet based communication network, for example the Internet. According to the embodiment illustrated in FIG. 1, the operator server SO can transmit data messages to the mobile terminal TM via a short message server SMSC (Short Message Service Center). The server SMSC comprises an access gateway to communicate with the operator server SO over a packet based network, and another access gateway to communicate with at least the mobile service switch MSC through a packet based network. The packets transmitted by the server SO are formatted in the server SMSC into short messages SMS and/or multimedia messages MMS (Multimedia Messaging Service) transmitted to the mobile terminal TM.

Figure 2:
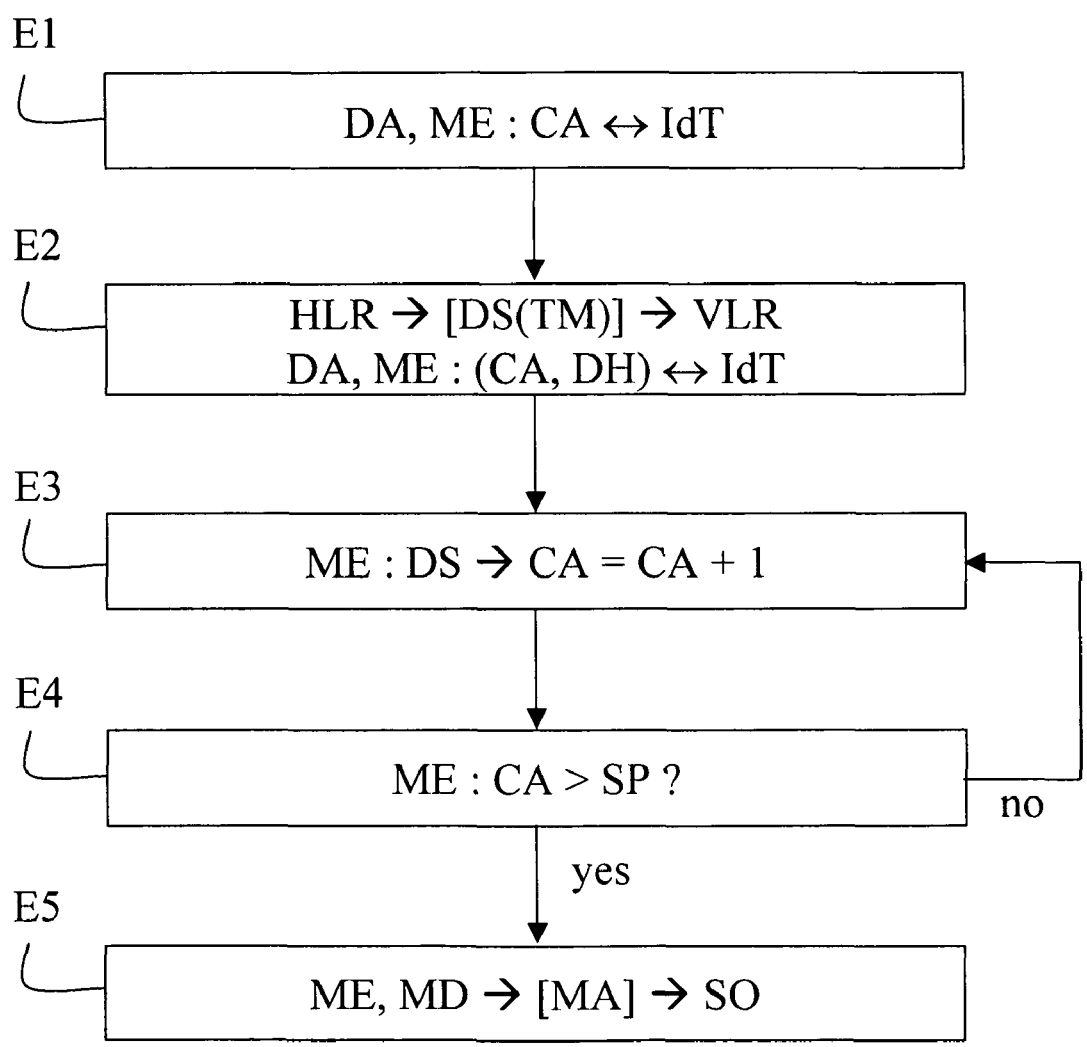
FIG. 2 is an algorithm of a detection method for anomalies in relation to a mobile terminal in a radiocommunication network according to the invention.

In reference to FIG. 2, a method for the detection of a traffic anomaly sent by a mobile terminal according to the invention comprises steps E1 to E5 automatically executed in the communication system according to the invention.

In Step E1, following a subscription of the user of the mobile terminal TM to the service of the operator of the radiocommunication network RR, a profile of the user is created in the register HLR. The evaluation module ME of the alert device DA assigns an authentication counter to the mobile terminal. Authentication accounts CA of the authentication counter are memorized matching an identifier IdT of the mobile terminal.

In Step E2, a network unit such as the register VLR of the localization area of the mobile terminal requests an authentication from the SIM card included in the mobile terminal further to the triggering of a procedure concerning the mobile terminal and requiring authentication from the latter. For example, when the mobile terminal TM is powered up, a localization procedure is triggered by the register VLR of the localization area of the mobile terminal, and may be followed by a call setting up procedure if the user of the mobile terminal should wish to place a call. For this purpose, the register VLR requests the register HLR to supply security data DS in the form of an authentication vector comprising e.g. a random challenge RAND, a signature SRES and an encryption key Kc to authenticate the mobile terminal. For example, the register VLR transmits the random challenge RAND to the mobile terminal so that the SIM card effects a cryptographic calculation applying the random challenge received and a secret key Ki to an authentication algorithm A3 to produce a signature SRES. The mobile terminal transmits the signature thus produced to the register VLR, which compares it to the signature included in the authentication vector transmitted by the register HLR.

The evaluation module ME of the alert device DA simultaneously activates a clock with the authentication counter to memorize clock data DH to match the authentication accounts CA of the authentication counter. The clock data and the authentication accounts are memorized, matching, among other things, the identifier IdT of the mobile terminal.

In Step E3, during a predetermined time interval, such as a periodic duration, the evaluation module ME increases the authentication account CA when security data DS are transmitted by the register HLR to a network unit such as the register VLR to authenticate the mobile terminal TM.

Step E3 is repeated each time security data DS are transmitted to authenticate the mobile terminal TM.

In Step 4, the evaluation method ME compares the authentication account CA to a predefined upper limit value SP in order to verify whether the authentication account CA exceeds the predefined upper limit value SP as a function of the previously memorized clock data DH.

If the authentication account CA does not exceed the predefined upper limit value SP, the procedure returns to Step E3. The evaluation module ME checks whether the authentication account CA exceeds the predefined upper limit value upon expiration of the predetermined time interval, and the authentication account CA is reset to zero if the authentication account CA does not exceed the predefined upper limit value. As a variant, the evaluation module ME compares the authentication account CA to the predefined upper limit value SP every time the authentication account is increased during the predetermined time interval. In another variant, the authentication account is compared to the predefined upper limit value after expiration of the predetermined time interval.

If the authentication account CA exceeds the predefined upper limit value SP, the evaluation module ME detects an anomaly at Step E5 and commands the detection module MD to transmit an alert message MA to an operator server SO.

The alert message MA contains, for example, the identifier IdT of the mobile terminal TM and an alert code corresponding to the predefined upper limit value. For example, the alert code may be a word such as "VIRUS" or a combination of figures and/or letters enabling the operator server SO to identify the nature of the alert and automatically to carry out certain procedures in order to limit the harmful consequences of the anomaly in the traffic sent by the mobile terminal.

Optionally, the alert message MA may contain an indication concerning the date on which the upper limit value has been exceeded by an account CA and the time taken by the counter to exceed the said upper limit value.

By ways of example, the operator server SO can thus transmit a short message SMS to the mobile terminal TM if a calling number of the latter has been transmitted in the alert message by the alert device DA in order to advise the user of the mobile terminal that a virus has been detected, or else trigger actions within the radiocommunication network to stop the abnormal transmission of traffic emanating from the mobile terminal.

The actions carried out by the server SO can be configured and modified at any time. Different actions can be performed consecutively to process the anomaly. For example, one or more warning messages can be transmitted to the mobile terminal at predetermined time intervals before commanding blocking of the mobile terminal. The server SO may furthermore provide different types of monitoring for mobile terminals, including for example monitoring of all mobile terminals, monitoring restricted to a subset of users of mobile terminals identified by an international identity IMSI, or else monitoring restricted to a subset of users of mobile terminals having certain types of terminals identified by an international identity IMEI.

The invention is not limited to the abovementioned embodiment, but, rather encompasses all variants reproducing its essential characteristics. In particular, the invention concerns any communication network using security data that can be transmitted to a network unit to authenticate the mobile terminal when a procedure concerning the mobile terminal requires authentication thereof.

According to one embodiment of the invention, the network is able indirectly to monitor the traffic sent by the mobile terminal and rapidly and reactively detect a potential traffic anomaly as a function of the duration of the predetermined time interval in order to minimize the harmful effects of such anomalies.

According to another characteristic of the invention, the authentication account can be reset to zero upon expiration of the predetermined time interval.

According to other characteristics of the invention, the authentication account can be compared to the predefined upper limit value upon expiration of the predetermined time interval, or the authentication account can be compared to the predefined upper limit value every time the authentication account is increased. In the latter case, the network may detect a traffic anomaly in real time and react immediately. Moreover, the authentication account can be compared to the predefined upper limit value after expiration of the predetermined time interval.

According to another characteristic of the invention, a set of security data may be transmitted to a network unit to authenticate the mobile terminal, and the authentication account assigned to the said mobile terminal can be increased by at least one unit when the said set of data is sent. For example, the said dataset is an authentication vector comprising a triplet or quintuplet of data.

Such security data can be transmitted to a network unit to authenticate the mobile terminal when a procedure concerning the mobile terminal requires authentication thereof. The said procedure may relate to a call or to sending a message, or else to any type of request issued or received by the mobile terminal, such as a change in the location of the mobile terminal. As the mobile terminal is authenticated for all procedure types, the invention enables detection of all types of traffic anomalies emitted by the mobile terminal, and more particularly a virus having infected the mobile terminal and commanding, for example, the automatic and regular transmission of short messages.

According to another characteristic of the invention, the method may further comprise transmitting an alert message comprising a mobile terminal identifier and an alert code to a server connected to the radiocommunication network further to the detection of a traffic anomaly in connection with the mobile terminal. Automatically, the network may make an appropriate decision to process the anomaly. For example, the said server can transmit a message to the mobile terminal to advise the terminal's user of the fact that the mobile terminal is experiencing a malfunction.

The alert message can be interpreted by the server in different ways, for example as a signal of the detection of a potentially abnormal behavior of the mobile terminal or as a signal of a definite detection of a virus in the mobile terminal.

Further to the reception and analysis of the alert message, the server may automatically command administrative blocking of the mobile terminal, such as partial blocking prohibiting sending of any short message from the mobile terminal, partial blocking prohibiting any communication concerning calls or sending of any short message from the mobile terminal, or even total blocking prohibiting all activity of the mobile terminal, including the possibility for the mobile terminal to receive calls or messages or to connect to the network.

The invention also concerns a device capable of communicating with a radiocommunication network location register to detect an anomaly in the traffic sent from at least one mobile terminal in the radiocommunication network, characterized in that it comprises:

means to increase an authentication account assigned to the mobile terminal for at least a predetermined time interval, when security data are transmitted to a network unit to authenticate the mobile terminal, and means to compare the authentication account to a predefined upper limit value in order to detect an anomaly in the traffic sent by the mobile terminal if the authentication account exceeds the predefined upper limit value.

The device may be included in the location register.

The invention claimed is:

1. A method for detecting the presence of a virus in a mobile terminal within a radiocommunication network comprising the following steps:

creating a profile in a home location register (HLR) in a first device connected to the radiocommunication network when a mobile terminal subscribes to the service of an operator of the radiocommunication network, said profile including an authentication counter;

receiving a first authentication request from a visiting location register (VLR) in a second device connected to the radiocommunication network when the mobile terminal accesses the radiocommunication network from the VLR's localization area, said authentication request comprising a request to the HLR for security data corresponding to the mobile terminal;

storing a current clock data in the profile corresponding to the mobile terminal accessing the radiocommunication network in response to the first authentication request;

increasing the authentication counter in the profile of the mobile terminal in response to the first authentication request and any subsequent authentication requests when the security data are transmitted from the HLR of the mobile terminal to the VLR generating the authentication request;

evaluating the authentication counter to determine whether the authentication counter has exceeded a predefined upper limit value in order to detect the presence of a virus in the mobile terminal; and sending an alert message when the authentication counter exceeds the predefined upper limit.

2. The method according to claim 1, wherein the authentication counter is compared to the predefined upper limit value upon expiration of a predetermined time interval.

3. The method according to claim 1, wherein the authentication counter is reset to zero upon expiration of a predetermined time interval.

4. The method according to claim 1, wherein the authentication counter is compared to the predefined upper limit value each time the authentication counter is increased.

5. The method according to claim 1, wherein a set of security data is transmitted to a a VLR to authenticate the mobile terminal and the authentication counter assigned to the mobile terminal is increased by at least one unit when the said set is transmitted.

6. The method according to claim 1, wherein the alert message further comprises a mobile terminal identifier and an alert code to a server connected to the radiocommunication network.

7. The method according the claim 6, wherein further to an analysis of the alert message received, the server transmits at least one warning message relating to the detected virus to the mobile terminal.

8. The method according to claim 7, wherein further to an analysis of the alert message received, the server commands blocking of the mobile terminal.

9. The method according to claim 6, wherein further to an analysis of the alert message received, the server commands blocking of the mobile terminal.

10. The method according to claim 1, wherein the predefined upper limit value is 100 and the predetermined period of time is twenty minutes.

11. The method according to claim 1, wherein the virus causes useless resource consumption on the part of the mobile terminal or of the radiocommunication network to which the mobile terminal is connected.

12. The method according to claim 11, wherein the virus causes the mobile terminal to send repeated short message service (SMS) messages.

13. A device capable of communicating with a radiocommunication network location register to detect a virus in a mobile terminal in the radiocommunication network, said device comprising:

a home location register (HLR) in a first device connected to the radiocommunication network, said HLR storing a profile which includes an authentication counter assigned to the mobile terminal, said HLR increasing the authentication counter during at least a predetermined time interval each time security data are transmitted to a visiting location register (VLR) in a second device connected to the radiocommunication network in response to a request from the VLR to authenticate the mobile terminal;

alert device for receiving the request for security data from the VLR when the mobile terminal first accesses the radiocommunication network from the VLR's localization area during the predetermined time interval and for causing a current clock data to be stored, and detection module for comparing the authentication counter to a predefined upper limit value in order to detect a virus in the mobile terminal if the authentication account exceeds the predefined upper limit value.

14. The device according to claim 13, wherein the alert device compares the authentication counter to the predefined upper limit value upon expiration of a predetermined time interval.

15. The device according to claim 13, wherein the authentication counter is reset to zero upon expiration of a predetermined time interval.

16. The device according to claim 13, wherein the alert device compares the authentication counter to the predefined upper limit value each time the authentication counter is increased.

* * * * *